US010520597B2

(12) United States Patent
Kalyandurg et al.

(10) Patent No.: US 10,520,597 B2
(45) Date of Patent: Dec. 31, 2019

(54) AIRCRAFT RADAR SYSTEM FOR BIRD AND BAT STRIKE AVOIDANCE

(71) Applicant: Honeywell International Inc., Morris Plains, NJ (US)

(72) Inventors: Niranjan Kalyandurg, Bangalore (IN); Charan Ebsv, Hyderabad (IN); Tirumala Rao Koka, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 305 days.

(21) Appl. No.: 15/374,958

(22) Filed: Dec. 9, 2016

(65) Prior Publication Data
US 2018/0164431 A1 Jun. 14, 2018

(51) Int. Cl.
*G01S 13/93* (2006.01)
*G01S 7/62* (2006.01)
(Continued)

(52) U.S. Cl.
CPC .......... *G01S 13/9303* (2013.01); *G01S 7/062* (2013.01); *G01S 7/22* (2013.01); *G01S 7/295* (2013.01);
(Continued)

(58) Field of Classification Search
CPC ...... G01S 13/003; G01S 13/06; G01S 13/426; G01S 13/52; G01S 13/58; G01S 13/66;
(Continued)

(56) References Cited

U.S. PATENT DOCUMENTS

| 4,141,522 A | 2/1979 | Lambregts |
| 5,661,486 A | 8/1997 | Faivre et al. |

(Continued)

FOREIGN PATENT DOCUMENTS

| EP | 1533866 A1 * | 5/2005 | ........... G01S 13/426 |
| EP | 2857857 A1 | 4/2015 | |

(Continued)

OTHER PUBLICATIONS

Spencer, "A Compact Phased Array Radar for UAS Sense and Avoid," Brigham Young University, BYU Scholars Archive, Nov. 2015, 107 pp.

(Continued)

*Primary Examiner* — Bernarr E Gregory
*Assistant Examiner* — Daniel P Malley, Sr.
(74) *Attorney, Agent, or Firm* — Shumaker & Sieffert, P.A.

(57) ABSTRACT

This disclosure is directed to techniques, methods, devices, and systems for generating a bird and bat detection radar output using weather radar. In one example, a method includes generating, by a computing device that comprises one or more processors and is onboard a vehicle, a radar control output for an aircraft weather radar system to generate a radar transmission tuned to detect birds and bats. The method further includes receiving, by the computing device, radar data in response to the radar transmission. The method further includes determining, by the computing device, whether the radar data comprises data indicative of detected birds or bats. The method further includes generating, by the computing device, an output based at least in part on the data indicative of the detected birds or bats.

20 Claims, 7 Drawing Sheets

(51) Int. Cl.
| | |
|---|---|
| *G01S 7/22* | (2006.01) |
| *G01S 7/295* | (2006.01) |
| *G01S 13/00* | (2006.01) |
| *G01S 13/06* | (2006.01) |
| *G01S 13/42* | (2006.01) |
| *G01S 13/52* | (2006.01) |
| *G01S 13/58* | (2006.01) |
| *G01S 13/66* | (2006.01) |
| *G01S 13/86* | (2006.01) |
| *G01S 13/87* | (2006.01) |
| *G01S 13/02* | (2006.01) |
| *G01S 7/06* | (2006.01) |
| *G01S 13/95* | (2006.01) |

(52) U.S. Cl.
CPC ............ *G01S 13/003* (2013.01); *G01S 13/06* (2013.01); *G01S 13/426* (2013.01); *G01S 13/52* (2013.01); *G01S 13/58* (2013.01); *G01S 13/66* (2013.01); *G01S 13/86* (2013.01); *G01S 13/867* (2013.01); *G01S 13/87* (2013.01); *G01S 13/953* (2013.01); *G01S 2013/0254* (2013.01); *Y02A 90/18* (2018.01)

(58) Field of Classification Search
CPC ...... G01S 13/867; G01S 13/865; G01S 13/86; G01S 13/87; G01S 13/9303; G01S 13/953; G01S 2013/0254; G01S 7/062; G01S 7/22; G01S 7/295; Y02A 90/18
See application file for complete search history.

(56) References Cited

U.S. PATENT DOCUMENTS

| | | | |
|---|---|---|---|
| 5,945,926 A | 8/1999 | Ammar et al. | |
| 6,208,284 B1 | 3/2001 | Woodell et al. | |
| 6,741,208 B1 | 5/2004 | West et al. | |
| 7,068,210 B1 | 6/2006 | Mitra et al. | |
| 7,706,979 B1 | 4/2010 | Herwitz | |
| 8,052,767 B2 | 11/2011 | Sands et al. | |
| 8,134,491 B1 | 3/2012 | Meyer et al. | |
| 8,170,730 B2 | 5/2012 | Shue | |
| 8,279,109 B1 | 10/2012 | Piesinger | |
| 8,570,211 B1 | 10/2013 | Piesinger | |
| 8,576,112 B2 | 11/2013 | Garrec et al. | |
| 8,616,144 B2 | 12/2013 | Yifrach | |
| 8,757,551 B2 | 6/2014 | Margalit | |
| 9,208,687 B2 | 12/2015 | Wang et al. | |
| 2010/0042275 A1* | 2/2010 | Kirk | G01W 1/04 701/14 |
| 2010/0114416 A1* | 5/2010 | Au | G01C 21/165 701/23 |
| 2011/0125349 A1 | 5/2011 | Ace | |
| 2012/0313779 A1 | 12/2012 | Papaefstathiou et al. | |
| 2013/0041856 A1* | 2/2013 | Benitez | G01S 7/415 706/12 |
| 2013/0088380 A1* | 4/2013 | Isoda | G01S 7/285 342/109 |
| 2014/0085107 A1 | 3/2014 | Gutierrez | |
| 2014/0139366 A1 | 5/2014 | Moses et al. | |
| 2015/0285897 A1* | 10/2015 | Kilty | G01S 7/02 342/195 |
| 2016/0282131 A1 | 9/2016 | Palfreyman | |
| 2016/0363652 A1 | 12/2016 | Hamminga et al. | |
| 2017/0090011 A1* | 3/2017 | West | G01S 7/28 |

FOREIGN PATENT DOCUMENTS

| | | |
|---|---|---|
| WO | 2010023253 A1 | 3/2010 |
| WO | 2010034297 A1 | 4/2010 |

OTHER PUBLICATIONS

U.S. Appl. No. 14/488,129, by Honeywell International Inc. (Inventors: David C. Vacanti.), filed Sep. 16, 2014.
U.S. Appl. No. 14/488,154, by Honeywell International Inc. (Inventors: David C. Vacanti et al.), filed Sep. 16, 2014.
"WXR-2100 MultiScan ThreatTrack Weather Radar," Rockwell Collins, Mar. 2014, 2 pp.
Honeywell Aerospace, "More Accurate Weather Detection at Long Ranges," IntuVue, Oct. 2008, Honeywell International Inc., 2 pp.
Nasa et al., "First Steps Toward Drone Traffic Management," Nasa Ames, retrieved from https://www.nasa.gov/feature/ames/first-steps-toward-drone-traffic-management, Nov. 19, 2015, 4 pp.
U.S. Appl. No. 15/444,716, by Honeywell International Inc. (Inventors: Lawrence J. Surace), filed Feb. 28, 2017.
Response to European Search Report dated May 3, 2018, from counterpart European Patent Application No. 17204249.1, filed on Aug. 8, 2018, 15 pp.
Gauthreaux, Jr., et al., "Monitoring bird migration with a fixed-beam radar and a thermal-imaging camera," J. Field Ornithol. vol. 77, No. 3, Sep. 11, 2006, pp. 319-328.
Dong, et al., "A Review of Radar Techniques for Ornithological Observations," 2009 IEEE, Antennas and Propagation Society International Symposium, Jun. 2009, 4 pp.
Gauthreaux Jr., et al., "Wildlife in Airport Environments: Chapter 13 Radar Technology to Monitor Hazardous Birds at Airports," John Hopkins University Press, Sep. 27, 2013, pp. 12 pp.
Extended European Search Report from Counterpart European Patent Application No. 17204249.1, dated May 3, 2018, 12 pp.
"Would Radars Detect Drones?," Awesome Drones, retrieved from http://awesome-drones.com/would-radars-detect-drones/, date accessed on Jan. 16, 2017, 5 pp.
Stephan, "Potential Use of On-Board Radar for Bird Detection and Avoidance," Proceedings of 2nd Bird Strike Committee—USA/Canada Meeting, Aug. 8-10, 2000, 2 pp.
Short, et al., "Birdstrike Prevention: Applying Aero-Science and Bio-Science," International Bird Strike Committee, Apr. 17-21, 2000, pp. 463-485.

* cited by examiner

AIRCRAFT RADAR SYSTEM FOR BIRD AND BAT STRIKE AVOIDANCE

This disclosure relates to aircraft weather radar systems.

BACKGROUND

An aircraft may receive information from a bird strike detection system to help the aircraft avoid a potentially hazardous bird strike. Birds and bats in the path of an aircraft may be ingested into the aircraft's engines, which may cause damage and loss of thrust. Bird strikes may occur during any phase of flight but are most common during the take-off and initial climb, and during the approach and landing phases of flight, due to the greater numbers of birds in flight at lower levels.

Airports may be responsible for bird control in their airspace and may be mandated to provide adequate control measures. For this purpose, airports may deploy ground-based bird detection radar systems to detect potential bird hazards runway areas and approach and departure corridors and provide bird-aircraft strike risk alerts to air traffic controllers and airfield bird control units.

SUMMARY

Examples of this disclosure are directed to systems, devices, methods, and techniques for enabling or configuring an aircraft weather radar system, for deployment on an aircraft or other vehicle, and that may alternate between performing radar scans tuned for weather detection and radar scans tuned for bird and bat detection, instead of the weather radar system only performing repeated scans for weather. In some examples, alternating a weather radar system between weather scanning mode and a bird and bat detection mode is facilitated by developments in radar technologies including digital adaptive phased array (DAPA) radar and combined pulsed and frequency modulated continuous wave (FMCW) modulated radar, which is enabled in part by advances in solid state radar transmission control electronics that enable high-power transmission with a solid state design. DAPA radar may enable performing each weather radar scan in approximately 90% less time than in typical weather radar systems, e.g., approximately three seconds rather than thirty seconds, which allows for interim intervals available to perform bird and bat tuned radar scans in between the weather scans with no loss from nominal refresh rate for the weather scans. Mixed pulsed and FMCW radar may enable a combination of high average power, minimal or no blind range, and high range resolution, which may contribute to enabling the weather radar system to be tuned intermittently to a radar transmission mode well-suited for detecting birds and bats rather than weather.

The weather radar system may incorporate control software for controlling the radar system to perform both the weather-tuned scans and the bird and bat tuned scans in alternation. The weather radar system may also incorporate processing software specialized for interpreting radar signals received in response to radar transmissions to detect data indicative of the presence, positions, and directions of motion of flocks of birds or bats. In some examples, the weather radar system may also receive data from an infrared sensor that may complement the radar scans for the detection of birds and bats. The weather radar system may also receive external data from an external data service that may provide bird and bat detection data originating from other aircraft and/or from ground-based radar systems, and may incorporate that external data and combine or compare the external data with its own bird and bat detection data, in some examples. By advantageously detecting flocks of birds or bats, a weather radar system of this disclosure may help pilots and flight crews of an ownship and other aircraft better avoid bird or bat strike hazards to an aircraft in flight while also avoiding unnecessary detours in flight, thereby promoting fuel efficiency, hazard avoidance, and shorter flights.

In one example, a method includes generating, by a vehicle weather radar system that comprises one or more processors and is onboard a vehicle, a radar control output for the vehicle weather radar system to generate a radar transmission tuned to detect at least one of birds and bats. The method further includes receiving, by the vehicle weather radar system, radar data in response to the radar transmission. The method further includes determining, by the vehicle weather radar system, whether the radar data comprises data indicative of detected birds or bats. The method further includes generating, by the vehicle weather radar system, an output based at least in part on the data indicative of the detected birds or bats.

Another example is directed to a vehicular weather radar system. The vehicular weather radar system includes one or more processors and one or more memory devices operably coupled to the one or more processors. The one or more processors are configured to generate a radar control output for an aircraft weather radar system to generate a radar transmission tuned to detect at least one of birds and bats. The one or more processors are further configured to receive radar data in response to the radar transmission. The one or more processors are further configured to determine whether the radar data comprises data indicative of detected birds or bats. The one or more processors are further configured to generate an output based at least in part on the data indicative of the detected birds or bats.

Another example is directed to a vehicular weather radar device. The vehicular weather radar device includes one or more processors and one or more memory devices operably coupled to the one or more processors. The one or more memory devices include executable instructions configured to cause the one or more processors to generate a radar control output for an aircraft weather radar system to generate a radar transmission tuned to detect at least one of birds and bats. The one or more memory devices further include executable instructions configured to cause the one or more processors to receive radar data in response to the radar transmission. The one or more memory devices further include executable instructions configured to cause the one or more processors to determine whether the radar data comprises data indicative of detected birds or bats. The one or more memory devices further include executable instructions configured to cause the one or more processors to generate an output based at least in part on the data indicative of the detected birds or bats.

The details of one or more examples are set forth in the accompanying drawings and the description below. Other features, objects, and advantages will be apparent from the description and drawings, and from the claims.

DETAILED DESCRIPTION

Various examples are directed to techniques, systems, devices, and methods for enabling or configuring an aircraft weather radar system to alternate between performing radar scans tuned for weather detection and radar scans tuned for bird and bat detection. Aircraft weather radar systems of various examples may also send bird and bat detection data to and receive bird and bat detection data from an external data center. Aircraft weather radar systems of various examples may provide enhanced situational awareness and avoidance of bird and bat strikes by an aircraft.

Figure 1:
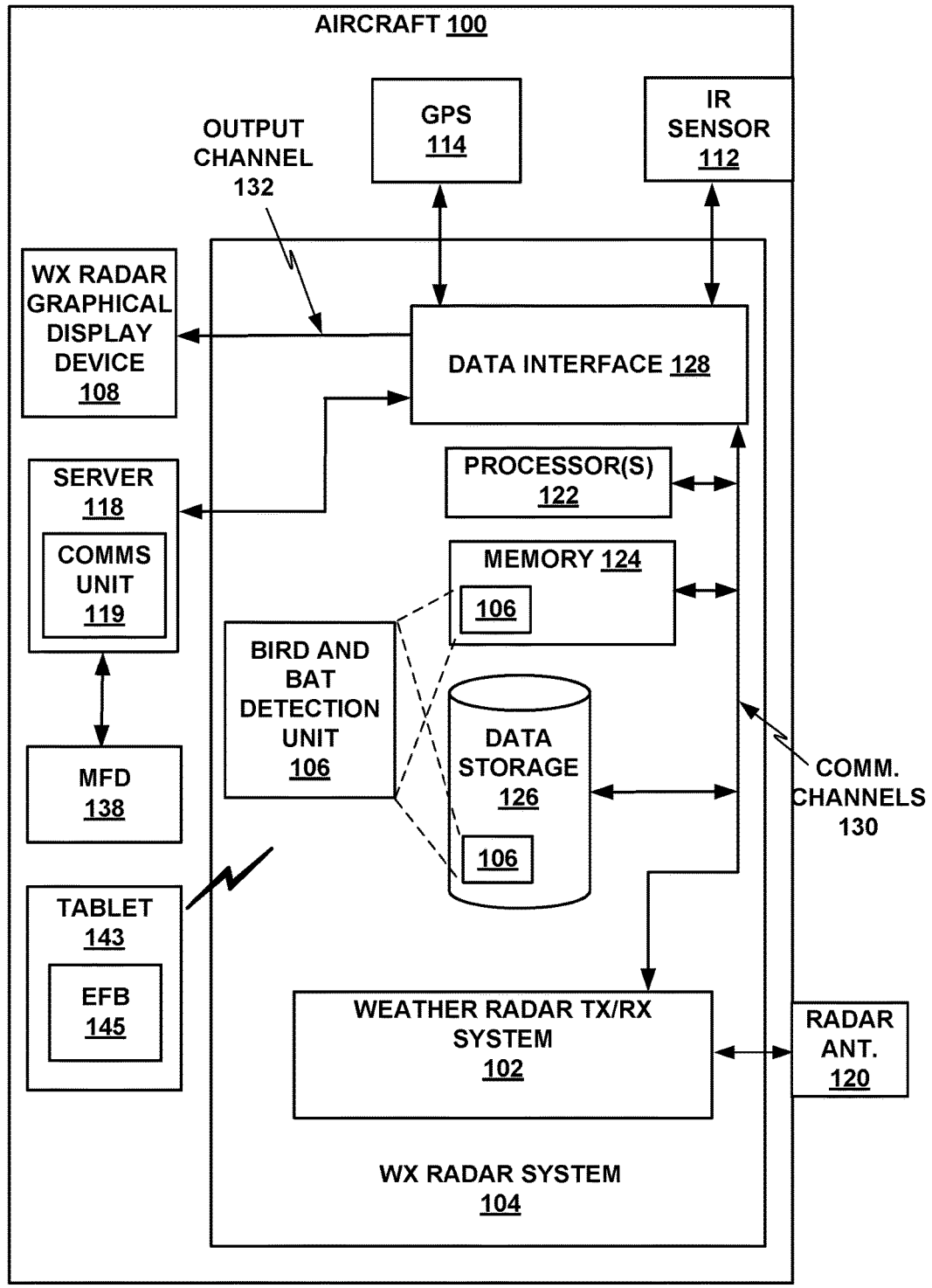
FIG. 1 depicts a conceptual block diagram of an example aircraft that includes a weather radar system that performs bird and bat detection as well as weather radar processing, in accordance with example aspects of this disclosure.

FIG. 1 depicts a conceptual block diagram of an example aircraft 100 that includes a weather radar system 104 that performs bird and bat detection as well as weather radar processing, in accordance with example aspects of this disclosure. Example weather radar system 104 includes a weather radar transmission and reception (TX/RX) system 102 and a bird and bat detection unit 106. Example aircraft 100 also includes a weather radar graphical display device 108, a server 118, a multi-function display (MFD) device 138, and a GPS unit 114. Weather radar TX/RX system 102 may include radar transmission synthesizer features, radar transmission amplifier features, radar transmission and reception features, and radar signal receiving features. Weather radar system 104 may include solid state radar transmission control electronics that enable high-power transmission with a solid state design.

Bird and bat detection unit 106 may be a software module or other body of software, as further described below, that may configure weather radar TX/RX system 102 to send radar transmission specialized for bird and bat detection intermittently with radar transmissions specialized for weather detection, and/or that may configure weather radar system 104 for performing processing specialized for bird and bat detection from weather radar return signals, intermittently with performing processing specialized for characterizing weather from weather radar return signals. For example, in a Digital Active Phased Array (DAPA) implementation, weather radar system 104 may perform a full weather radar scan of the designated area of sky within approximately three seconds, then use at least part of an interval before a subsequent weather radar scan to perform at least one radar scan of the same or an overlapping part of the sky tuned for bird and bat detection. Weather radar system 104 with bird and bat detection unit 106 may thus evaluate weather radar data from aircraft weather radar TX/RX system 102 to determine whether the weather radar signal includes data that indicates the presence of a flock of birds or bats.

Aircraft 100 may also include a secondary or auxiliary graphical display device, such as MFD 138. Aircraft 100 also includes server 118, which has its own communications unit 119, which may enable or configure server 118 to communicate with an external data service, as further described below. MFD 138 may be connected to data interface 128 of weather radar system 104 via onboard server 118. A pilot or other flight crew of the aircraft may also operate an electronic flight bag (EFB) 145 executing on, e.g., a tablet computer 143, or a tablet computer 143 executing another display application other than an EFB. MFD 138, tablet 143, and/or weather radar graphical display device 108 may be used to display weather radar bird and bat detection outputs, as further described below.

Aircraft weather radar TX/RX system 102 is connected to a radar antenna 120. Weather radar TX/RX system 102 and radar antenna 120 may be implemented as a DAPA radar in some examples. Weather radar TX/RX system 102 and radar antenna 120 may be implemented in a traditional gimbaled or other mechanically scanning radar systems in some examples. In mechanically scanning radar implementations, bird and bat detection unit 106 may also control weather radar TX/RX system 102 to perform bird and bat tuned scanning runs in between sets of transmission, reception, and processing tuned to detect weather. Weather radar system 104 includes one or more processor(s) 122, one or more memory devices 124, one or more data storage devices 126, and a data interface 128. Some of these features, such as one or more processor(s) 122 and one or more memory devices 124, may be part of a weather radar control system that configures or controls weather radar TX/RX system 102. Weather radar system 104 also includes communication channels 130 and output channel 132, such that communication channels 130 are configured to convey data between one or more processors 122, one or more memory devices 124, one or more data storage devices 126, and data interface 128, and output channel 132 is configured to communicate outputs from weather radar system 104, such as to weather radar graphical display device 108, MFD 138, and/or tablet 143.

Bird and bat detection unit 106 may be implemented as one or more executable instruction program code and/or data stored or encoded in software applications, modules, libraries, or one or more portions thereof, that may be stored on data storage 126 and/or loaded onto memory 124 and executed by one or more processors 122, in some examples. Bird and bat detection unit 106 may also be implemented at least in part with specialized processing hardware such as one or more graphical processing units (GPUs), one or more field-programmable gate arrays (FPGAs), one or more systems on a chip (SoCs), or other type of processing hardware, potentially in combination with executable software or firmware. Bird and bat detection unit 106 may be implemented at least in part as, or include, any combination of hardware or hardware and software. Bird and bat detection unit 106 may be implemented at least in part as, or include, one or more executable applications, application modules, libraries, classes, methods, objects, routines, subroutines, firmware, and/or embedded code, for example. Examples of techniques and methods performed by bird and bat detection unit 106 are described further below with additional reference to the subsequent figures.

Aircraft weather radar TX/RX system 102 is operatively connected to other features of weather radar system 104, such as through communication channels 130 between weather radar TX/RX system 102 and data interface 128 of weather radar system 104. Weather radar system 104 is operatively connected to weather radar graphical display device 108, such as through output channel 132. Weather radar system 104 may thus generate both weather radar outputs and bird and bat detection outputs, and communicate the weather radar outputs and the bird and bat detection outputs to weather radar graphical display device 108, in some examples. Weather radar system 104 may also communicate bird and bat detection outputs to EFB 145 or another application executing on a tablet computer 143 operated by a pilot or other flight crew, via a wireless connection between data interface 128 and tablet 143, in some examples. Weather radar system 104 may also communicate bird and bat detection outputs to MFD 138 in some examples, which may be by way of onboard server 118 in some examples. Weather radar system 104, tablet 143, and/or MFD 138 via server 118 may also receive bird and bat detection outputs from an external data aggregating service that may aggregate and dispense bird and bat detection data that originates from other aircraft bird and bat detection radar systems and/or from other data sources such as ground-based bird and bat detection radar systems, as further described below. Weather radar system 104, tablet 143, and/or server 118 may combine bird and bat detection data collected and processed by aircraft weather radar TX/RX system 102 and weather radar system 104 with bird and bat detection data received from an external data aggregating service, in some examples.

Examples in which aircraft weather radar TX/RX system 102 is implemented as DAPA radar may enable faster scan capability than traditional gimbaled radar systems, and may scan the volume of airspace around the aircraft for weather detection in approximately one-tenth of the time taken by current gimbal radars, e.g., approximately three seconds rather than thirty seconds. Aircraft weather radar TX/RX system 102 may thus use at least some of an intervening time between weather radar scans to perform radar scanning tuned to bird and bat detection rather than weather detection, at least during relatively higher-risk periods of flight such as during take-off and landing. Bird and bat detection unit 106 may cause or configure aircraft weather radar system 104 to use wave forms and wavelengths customized for bird and bat detection as part of combined pulsed and frequency modulated continuous wave (FMCW) modulation to obtain higher average power, minimal or no blind range, and high range resolution for radar operation intervals customized for bird and bat detection. For example, bird and bat detection unit 106 may preferentially use wavelengths on the order of single centimeters or tens of centimeters to be tuned for bird and bat detection, in some examples. Weather radar system 104 may also apply algorithms specific to bird and bat detection and determination of location and altitude of detected birds and bats. For example, the algorithms may be configured to detect radar return data indicative of solid objects of on the order of between approximately two centimeters and two meters, for example. The algorithms may be configured to detect motions typical of wing movements of birds or bats, and/or typical motions through the sky characteristic of birds or bats. For example, the algorithms may be configured to detect Doppler oscillations in radar return signals of an amplitude and phase consistent with being caused by the motions of individual wings of a bird or bat in flight, or to detect Doppler smearing or fuzziness (in which wing motions of many birds or bats in a flock don't have enough individual signal to noise ratio to be individually detected, but which in the aggregate smear the radar return signal into a noisy or fuzzy band centered on the return signal from the bodies of the birds or bats, and potentially superimposed on a coherent Doppler adjustment due to a net radial motion of the flock relative to the aircraft) of an amplitude consistent with being caused by the motions of wings of a bird or bat in flight.

In some examples, aircraft 100 may also have at least one infrared sensor 112 that is also connected to and used by weather radar system 104 to gain additional bird and bat detection data that may complement the radar bird and bat detection data. The infrared data may help identify bird and bat flocks and help determine the positions of bird and bat flocks. Bird and bat detection unit 106 may evaluate infrared data to determine if the data matches expected sizes, surface temperatures, and/or motions of birds or bats, for example.

Weather radar system 104 may be considered a vehicular weather radar device in which memory 124 (one or more memory devices 124) includes executable instructions encoding bird and bat detection unit 106 configured to cause processors 122 (one or more processors 122) to generate a radar control output for weather radar system 104 to generate a radar transmission tuned to detect at least one of birds and bats. Memory 124 further includes executable instructions configured to cause processors 122 to receive radar data in response to the radar transmission. Memory 124 further includes executable instructions of bird and bat detection unit 106 configured to cause the processors 122 to determine whether the radar data comprises data indicative of detected birds or bats. Memory 124 further includes executable instructions of bird and bat detection unit 106 configured to cause the processors 122 to generate an output based at least in part on the data indicative of the detected birds or bats.

Weather radar system 104 is shown and described in the example of FIG. 1 as an aircraft weather radar system for installation or disposal onboard an aircraft. This may include any type of aircraft, including fixed-wing or rotary-wing, and piloted or unmanned aerial vehicle (UAV). Other examples may be directed to any type of vehicle weather radar system or vehicular weather radar system that may be configured or designed for installation or disposal onboard any other type of vehicle, such as a marine vessel, a marine platform, an airship, or a spacecraft.

Figure 2:
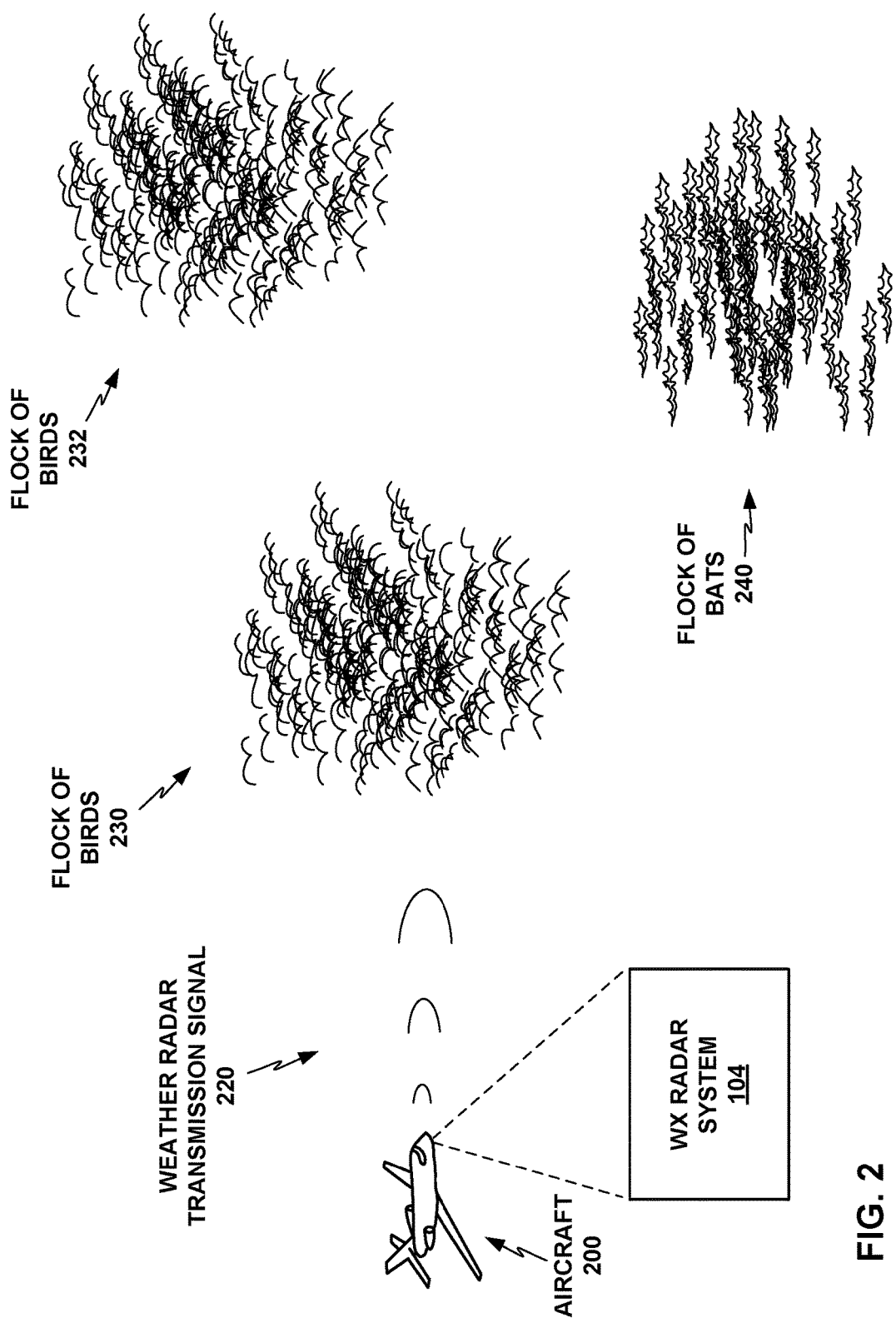
FIG. 2 shows an aircraft approaching a nearby flock of birds, a more distant flock of birds, and a more distant flock of bats, and emitting a weather radar transmission intermittently tuned for bird and bat detection, in accordance with example aspects of this disclosure.

FIG. 2 shows an aircraft 200 approaching a nearby flock of birds 230, a more distant flock of birds 232, and a more distant flock of bats 240, and emitting a weather radar transmission 220 intermittently tuned for bird and bat detection, in accordance with example aspects of this disclosure. Aircraft 200 is equipped with weather radar system 104 configured for intermittent bird and bat detection, as shown in FIG. 1. Aircraft 200 and weather radar system 104 receive and process radar return signals from radar transmission 220 reflecting off of flocks of birds 230, 232 and flock of bats 240, and detect and characterize the positions and directions of motion of flocks of birds 230, 232 and flock of bats 240.

Weather radar system 104 may use an example algorithm in which a bird is represented by a six-dimensional (6D) vector, in which first three components represent the position of a bird in three dimensions and next three components represent the velocity components of the bird in each of the three dimensions:

$$p_i = [x_i, y_i, z_i, \dot{x}_i, \dot{y}_i, \dot{z}_i]' = [p_i^p p_i^v]' \quad \text{(Eq. 1)}$$

Weather radar system 104 may assemble a 6×N (6 by N) matrix representing a number N of detected birds. To identify individual bird flocks from these assembly of all birds, weather radar system 104 may use a kernel density estimator (KDE), a non-parametric way to estimate the probability density function of a random variable. Kernel density estimation addresses a fundamental data smoothing problem where inferences about the population are made based on a finite data sample. Weather radar system 104 may plot this data on 2D polar coordinates of radius and azimuth to show contours of flocks of birds or bats, or more particularly, contours of a probability density function estimated for the position and extent of each detected flock of birds or bats.

Mathematically the KDE is defined as, $$\hat{f}_H(p) = \frac{1}{n}\sum_{i=1}^{n} K_H(p - p_i) \quad \text{(Eq. 2)}$$

where $$p = (p_1 p_2 p_3 p_4 \ldots p_d)^T \quad \text{(Eq. 3)}$$

are the group of flocks, and $$p_i = (p_{i1} p_{i2} p_{i3} \ldots p_{id}) \quad \text{(Eq. 4)}$$

are groups of birds; H is the bandwidth, which is symmetric and positive definite; and K is the kernel function which is symmetric and multivariate density:

$$K_H |H|^{-1/2} K(|H|^{-1/2} p) \quad \text{(Eq. 5)}$$

In some examples, bird and bat detection unit 106 may also identify a probability density function of detected birds or bats at least in part by using an identifier trained using a machine learning process applied to a set of data on movements of birds or bats of the determined species.

Figure 3:
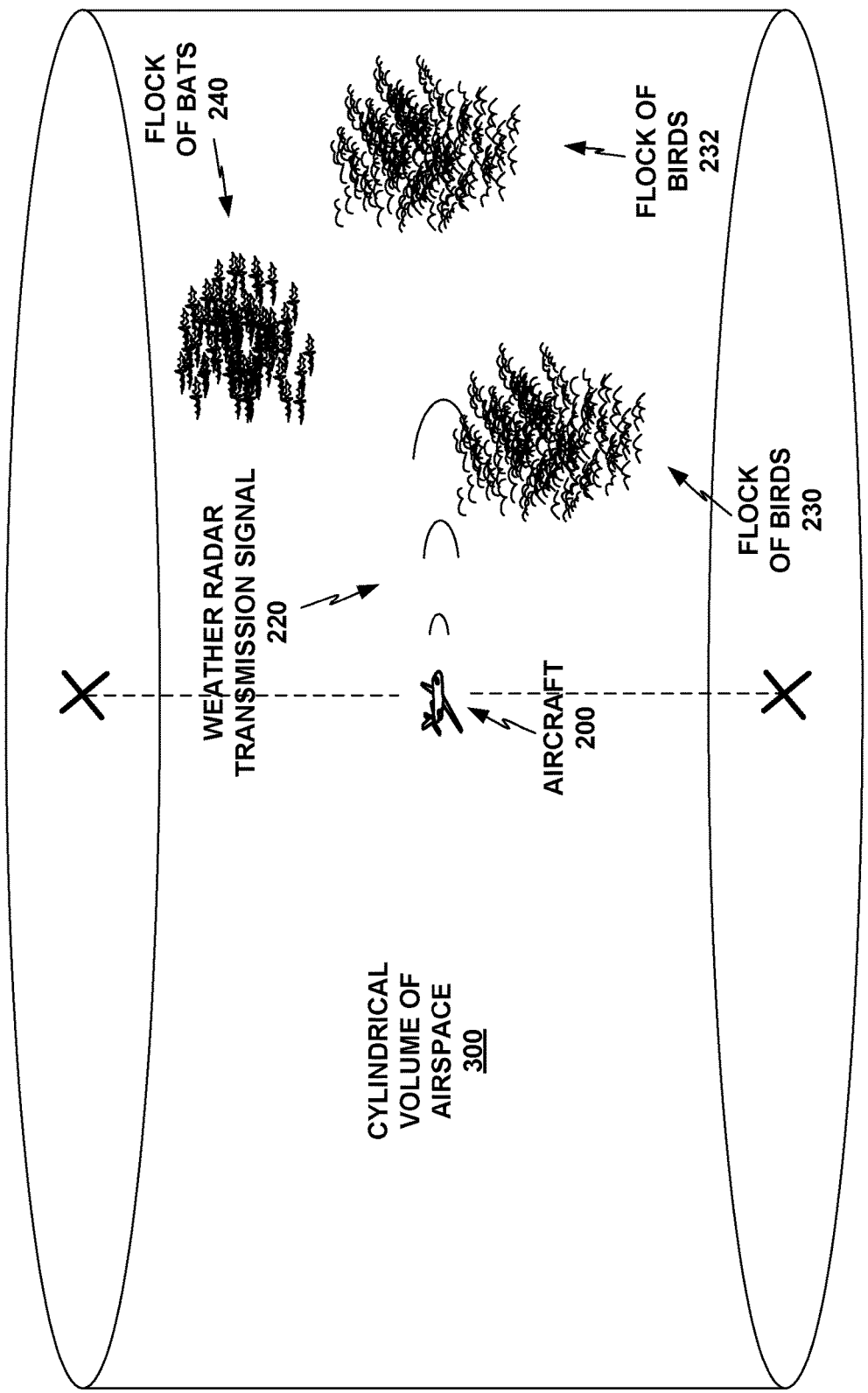
FIG. 3 shows an aircraft in a cylindrical volume of airspace covered by an aircraft weather radar system and for which a bird and bat detection unit may process bird and bat detection data for display, in accordance with example aspects of this disclosure.

FIG. 3 shows aircraft 200 in a cylindrical volume of airspace 300 covered by aircraft weather radar TX/RX system 102 and for which bird and bat detection unit 106 may process bird and bat detection data for display, in accordance with example aspects of this disclosure. In various examples, weather radar system 104 and/or an external data aggregating system as discussed below may perform coordinate transformations on the radar bird and bat detection data in comparison with the position and trajectory of aircraft 200 at the time the data was obtained, and plot the radar bird and bat detection data in, e.g., cylindrical volume of airspace 300 whose center is the geographical location of the aircraft 200 at the time the data was obtained, and with dimensions of, e.g., 10,000 feet radius and cylindrical height of 3,500 feet surrounding aircraft 200. Processing techniques that may be applied by weather radar system 104 and/or an external data aggregating system are further discussed below with reference to FIG. 5.

Cylindrical volume of airspace 300 may be only a portion of the total data coverage and range of aircraft weather radar TX/RX system 102, to simplify processing, focus on proximate potential hazards, and maintain accuracy. Bird and bat detection unit 106 may process bird and bat radar data coverage for volumes of airspace of other scales and dimensions in other examples. FIG. 3 shows the positions of flocks of birds 230, 232 and flock of bats 240 with reference to the position of aircraft 200 in volume of space 300, as detected via weather radar transmission signal 220 and determined by bird and bat detection unit 106. Bird and bat detection unit 106 may process and evaluate the returned radar data to generate a graphical output representing the positions of flocks of birds 230, 232 and flock of bats 240 with reference to the position of aircraft 200 in volume of space 300, as shown in FIG. 4.

Figure 4:
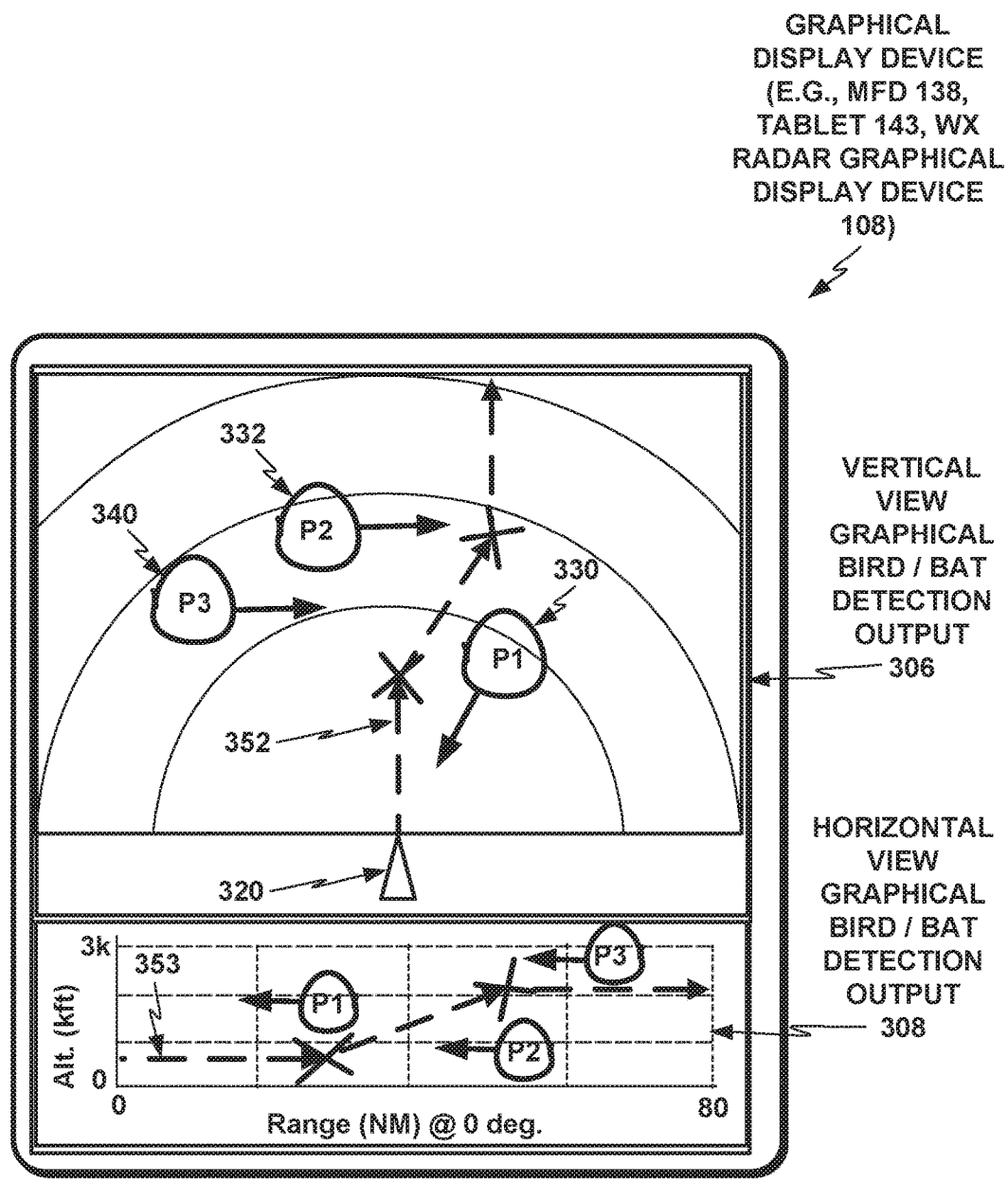
FIG. 4 shows a weather radar graphical display device displaying vertical and horizontal view bird and bat detection graphical outputs with potentially hazardous bird or bat flock indications generated by a bird and bat detection unit executing on a weather radar processing system, in accordance with example aspects of this disclosure.

FIG. 4 shows a weather radar graphical display device displaying vertical and horizontal view bird and bat detection graphical outputs 306, 308, respectively, with potentially hazardous bird or bat flock indications generated by bird and bat detection unit 106 executing on a weather radar system 104 as shown in FIG. 1, in accordance with example aspects of this disclosure. The graphical display device in FIG. 4 may correspond to MFD 138, tablet 143 (potentially executing EFB 145), or weather radar graphical display device 108 of aircraft 100 as shown in FIG. 1.

Vertical view bird and bat detection output 308 shows an aircraft icon 320 representing the ownship aircraft. Bird and bat detection output 308 may represent graphical renderings of the flocks of birds and bats shown in FIGS. 2 and 3, rendered by bird and bat detection unit 106, including flock icons 330, 332, and 340 representing flocks of birds 230 and 232 and flock of bats 240 as shown in FIGS. 2 and 3. Flock icons 330, 332, and 340 are labeled P1, P2, and P3 by bird and bat detection unit 106 in the graphical output, in this example, indicating that they are probability density function distributions in the airspace based on the available data. Bird and bat detection unit 106 also renders each of flock icons 330, 332, and 340 with an arrow representing the detected trajectory of each respective flock. Bird and bat detection unit 106 also determines and displays a vertical view recommended trajectory 352 for aircraft 100 to follow to avoid strike hazards with the detected flocks of birds and bats.

Bird and bat detection unit 106 also renders horizontal view bird and bat detection output 308 below the vertical view output 306 in this example. Horizontal view output 308 also shows corresponding flock icons for each of the flocks, also labeled P1, P2, and P3. Horizontal view output 308 also shows a horizontal view recommended trajectory 353 for avoiding strike hazards with the detected flocks of birds and bats. Horizontal view output 308 shows range in nautical miles (nm) along the x-axis and altitude in thousands of feet (kft) along the y-axis.

In either or both of the vertical and horizontal views, bird and bat detection unit 106 may also determine a level of risk that a detected flock of birds or bats may pose to aircraft 100, and render different flock icons in different colors to represent the determined level of risk. For example, bird and bat detection unit 106 may render a flock icon in green if it is far away from the aircraft's trajectory and flying away from the aircraft's trajectory, and poses little or no risk of striking the aircraft; may render a flock icon in red if the flock is determined to be directly in the path of the aircraft or is flying on a direct intercept course with the aircraft, and poses a high risk of striking the aircraft unless the aircraft changes course; and may render a flock in one or more intermediate colors such as yellow and orange, for example, for different intermediate levels of risk.

Figure 5:
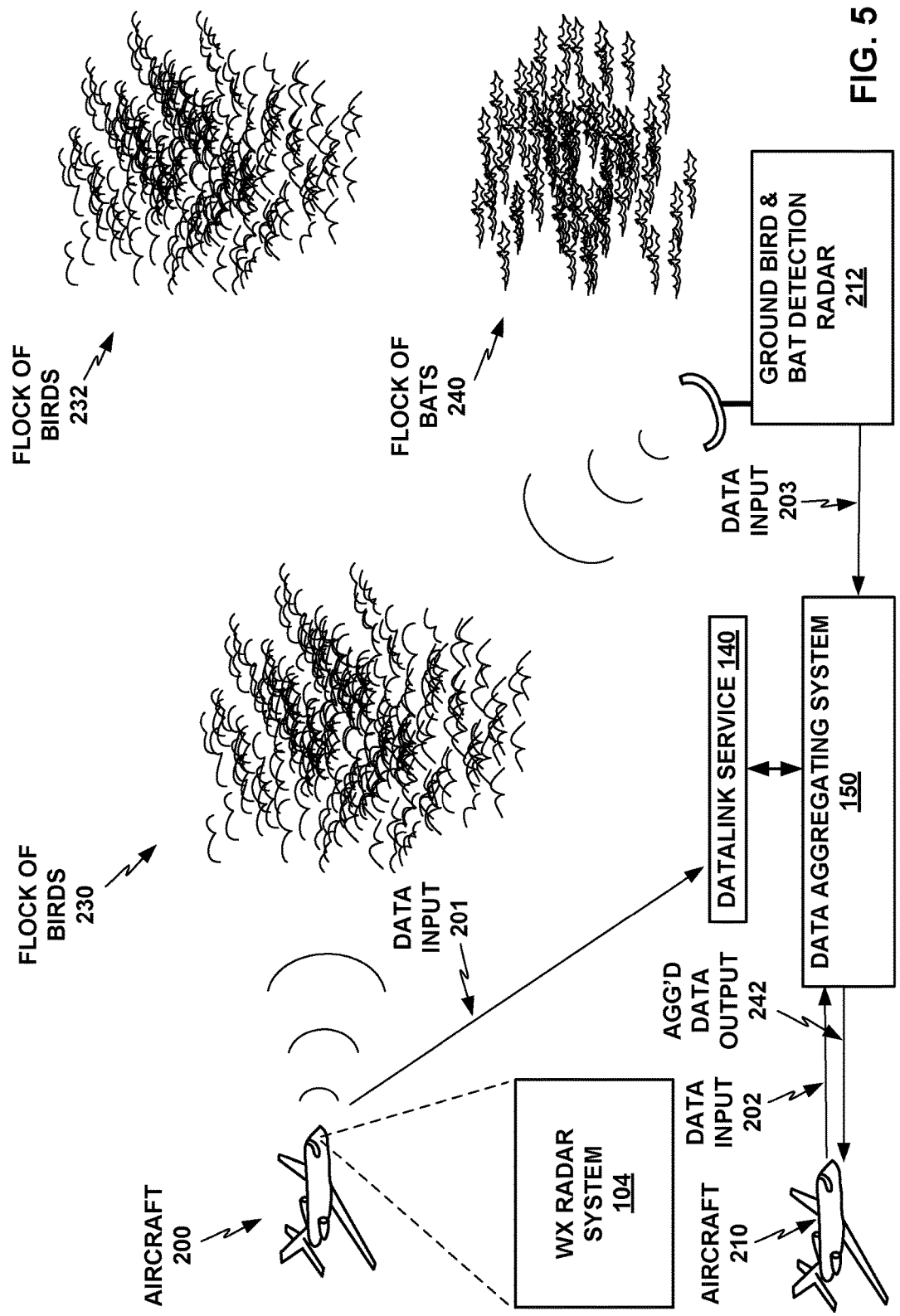
FIG. 5 depicts a conceptual diagram of an example data aggregating system configured to aggregate weather radar data and bird and bat detection data from weather radar processing systems from potentially large numbers of aircraft and other bird and bat data sources such as a ground-based bird and bat detection radar system, in accordance with example aspects of this disclosure.

FIG. 5 depicts a conceptual diagram of an example data aggregating system 150 configured to aggregate weather radar data and bird and bat detection data from weather radar processing systems 104 from potentially large numbers of aircraft including representative aircraft 200 and 210 and other bird and bat data sources such as ground-based bird and bat detection radar system 212, in accordance with example aspects of this disclosure. As shown in FIG. 5, aircraft 200 is in flight, while aircraft 210 may be on the ground on an airport surface, e.g., at a gate, on a taxiway, or on a runway. In various examples, data aggregating system 150 may collect, aggregate, and redistribute bird and bat detection data from one or more weather radar processing systems 104 from any suitable number of aircraft, and from any suitable number of other, non-aircraft bird and bat detection data sources such as ground-based bird and bat detection radar system 212. Thus, although two aircraft 200, 210 are shown in FIG. 5, in other examples, system 150 may be used with any suitable number of aircraft (e.g., more than two aircraft) and any suitable number of other bird and bat detection data sources (e.g., one or more ground-based bird and bat detection radar systems and/or other non-aircraft bird and bat detection data sources). Further, any of the features of data aggregating system 150 as described herein may be used in any suitable combination.

In the example shown in FIG. 5, aircraft 200 and 210 each include a weather radar system 104 with a bird and bat detection unit 106 as in FIG. 1. Aircraft 200, 210 may downlink bird and bat detection data inputs 201, 202, respectively, to data aggregating system 150. Weather radar processing systems 104 of aircraft 200 and 210 may each include a datalink system that communicates with data aggregating system 150 via datalink service 140, and/or other communications systems for communicating data with data aggregating system 150. For example, bird and bat detection unit 106 onboard aircraft 210 on an airport ground surface may communicate data via WiFi with an airport WiFi system, and thereby via an Internet connection with data aggregating system 150. The data inputs 201, 202 communicated from each aircraft 200 and 210 to data aggregating system 150 may be regular in some examples (e.g., at a predetermined frequency of time), or may be less regular in other examples (e.g., only upon request by system 150, by request from a flight crew or ground crew, or the like).

Data aggregating system 150 may receive bird and bat detection data from aircraft 200 and 210 and potentially also receives bird and bat detection data from other aircraft and/or non-aircraft data sources such as ground-based bird and bat detection radar system 212, or any other type of bird and bat detection system. Aircraft 200 is configured to communicate with data aggregating system 150 by datalink communication via datalink service 140, which may include various space-based, airborne, and/or ground-based transceivers, communication relays, or other assets, as further described below with reference to FIG. 6. Aircraft 200 may thereby communicate bird and bat detection data to data aggregating system 150 via datalink service 140. Similarly, aircraft 210 may downlink its own bird and bat detection data that aircraft 210 collects to data aggregating system 150.

Data aggregating system 150 is configured to generate aggregated bird and bat detection outputs 242 that constitute aggregated sets of bird and bat detection data from multiple sources. Data aggregating system 150 may generate aggregated bird and bat detection outputs 242 based on data from potentially large numbers both of weather radar processing systems 104 from various aircraft, and additional, non-aircraft bird and bat detection data sources. Data aggregating system 150 may communicate aggregated bird and bat detection outputs 242 to recipients such as aircraft 210 on an airport ground surface, as shown in FIG. 5, as well as to other recipients such as aircraft operators and subscribers to an aggregated bird and bat detection data service, which data aggregating system 150 may provide via datalink service 140, the Internet, or other communication means. Data aggregating system 150 may communicate aggregated bird and bat detection outputs 242 back to weather radar processing systems 104 of various aircraft (e.g., aircraft 200, 210) that communicate their bird and bat detection data to data aggregating system 150. Data aggregating system 150 may thus enable each of weather radar processing systems 104 onboard the various aircraft 200, 210 to graphically display bird and bat data radar maps based on bird and bat detection data that is also generated by other weather radar processing systems 104 onboard other aircraft, as well as additional bird and bat detection data from other data sources such as a ground-based bird and bat detection radar system 212.

In various examples, weather radar system 104 and/or external data aggregating system 150 may perform coordinate transformations on the radar bird and bat detection data in comparison with the position and trajectory of aircraft 100 at the time the data was obtained, and plot the radar bird and bat detection data in, e.g., a cylindrical volume whose base center is the geographical location of the aircraft 100 at the time the data was obtained, and with dimensions of, e.g., 10,000 feet radius and cylindrical height of 3,500 feet, as introduced above with reference to FIG. 3. In some examples, external data aggregating system 150 may perform analogous processing on radar bird and bat detection data from other sources such as a ground-based bird and bat detection radar system. Weather radar system 104 and/or data aggregating system 150 may combine radar bird and bat detection data from multiple sources, such as from one or more aircraft and one or more ground-based bird and bat detection radar systems, after coordinate transformations are made so that the data from different positions may be coordinated into an integrated data set. Weather radar system 104 and/or data aggregating system 150 may perform a coordinate transformation in accordance with:

$$P^r = P^r \cup (p^{rt} * [\text{Transformation matrix}]) \qquad \text{(Eq. 6)}$$

where $p^r$ is the ground center data, and $p^{rt}$ is the latest data from radar.

Weather radar system 104 and/or external data aggregating system 150 may add non-overlapping data from multiple sources together into an integrated data set. For data from multiple sources covering the same area that includes the same flock of birds or bats, weather radar system 104 and/or data aggregating system 150 may compare the data from each of the different sources and process the overlapping data. Processing the overlapping data may include, e.g., evaluating the relative accuracy of the data from each source, determining one data set to incorporate into an output in favor of the other data set if the first data set is evaluated to be much more accurate, or performing a weighted combination of the overlapping data sets if they are both determined to be of valuable accuracy.

Weather radar system 104 and/or data aggregating system 150 may also account for flight data indicative of details of flight of an aircraft receiving bird and bat radar detection data, such as flight path, speed, type of flight, flight clearance (e.g., for take-off or landing), and predicted flight trajectory. Bird and bat detection unit 106 executing on weather radar system 104 may receive such flight data from other aircraft systems onboard the aircraft, and may process the radar data in view of the flight data, and/or communicate both the flight data and the results of processing the radar data to data aggregating system 150 for processing. Weather radar system 104 and/or data aggregating system 150 may evaluate the bird and bat detection data in view of the flight data for a particular aircraft, to determine the level of potential risk of strike that any detected birds or bats may pose to the particular aircraft, and potentially to formulate a recommended change of course or new trajectory to divert the aircraft away from a detected risk of strike with birds or bats, as shown in FIG. 4.

In some examples in which the aircraft is in a controlled airspace such as surrounding an airport, weather radar system 104 and/or data aggregating system 150 may also generate an output that includes a recommended change of course, change of trajectory, or change of clearance and communicate that output directly to an air traffic controller (ATC). In some examples, weather radar system 104 and/or data aggregating system 150 may generate an output to an interface with a pilot or other flight crew that includes an option that the pilot or flight crew may select to communicate the recommended change of course, change of trajectory, or change of clearance to the air traffic controller.

The flock icons 330, 332, 340 shown in the bird and bat detection outputs 306, 308 generated by bird and bat detection unit 106, potentially supported by aggregated data from data aggregating system 150, and shown in FIG. 4 may thus visually represent real-time data of detected bird and bat flocks 230, 232, 240 within the cylindrical volume of airspace 300, as taken from aircraft 200 as well as potentially from other aircraft such as aircraft 210 and other data sources such as ground-based bird and bat detection radar system 212. Bird and bat detection unit 106 may plot the available bird and bat detection data in split graphic windows of a display device such as MFD 138, tablet 143, or weather radar graphical display device 108, where the vertical bird and bat detection output 306 displayed in the first window is a polar plot of radius and azimuth with bird flock density plots, and the horizontal bird and bat detection output 308 displayed in the second window is a Cartesian plot of Radius vs altitude with bird density plots.

Bird and bat detection unit 106 may use any of various techniques to determine the trajectories of detected bird or bat flocks and/or predict the future positions of detected bird or bat plots. Bird and bat detection unit 106 may model future bird or bat movements using a simple technique such as linearly extrapolating a detection direction of motion of a flock of birds or bats, or may use more sophisticated models, such as detecting a species of detected birds or bats, and modeling future movement by comparing detected motions with a behavioral model of the motions of birds or bats of the detected species. A model of motions of birds or bats of a detected species may be trained by machine learning on a large dataset of previously observed motions of birds or bats of the identified species, for example. Bird and bat detection unit 106 may thus predict a future trajectory of detected birds or bats by determining a species of the detected birds or bats and processing a detected trajectory of the detected birds or bats in comparison with a behavioral model of movements of birds or bats of the determined species, wherein the behavioral model of movements of birds or bats of the determined species is trained using a machine learning process applied to a set of data on movements of birds or bats of the determined species, in some examples.

Below is a simple linear model estimator that bird and bat detection unit 106 may apply in some examples to predict future positions of a flock of birds or bats:

$$p_i^{p:updated} = p_i^p + (p_i^s * \delta t) \quad \text{(Eq. 7)}$$

where bird and bat detection unit 106 updates the position matrix of a bird with respect to time using the velocity matrix of the individual birds. Bird and bat detection unit 106 may superimpose predicted future motions together with graphical indications of the detected positions and motions of detected birds and bats in bird and bat detection outputs 306, 308. Bird and bat detection unit 106 may subsequently, potentially repeatedly or continuously, update or correct indicated predicted future trajectories of detected birds or bats as bird and bat detection unit 106 continues receiving new data detecting the birds or bats over time. Bird and bat detection unit 106 may also continue receiving flight data on the flight of the aircraft from other aircraft systems, such as a Flight Management System (FMS), and continue updating the position and predicted trajectory of the aircraft relative to the detected birds or bats, and continue updating assessments of risk or any recommended changes of course for the aircraft in light of the updating data on the trajectories of both the aircraft and the birds or bats. Bird and bat detection unit 106 may continue updating the data on the detected birds and bats based on ongoing data received from data aggregating system 150, in some examples. Bird and bat detection unit 106 may continue generating newly updated bird and bat detection outputs 306, 308 in view of updated data on the position and trajectory of the aircraft for updated graphical displays for the pilot or other flight crew as shown in FIG. 4.

Data aggregating system 150 may be enabled to provide more extensive data on birds and bats in an airspace of interest than any one aircraft is capable of. In one example, weather radar system 104 onboard aircraft 200 may detect flock of birds 230, but flock of bats 240 may be obscured behind flock of birds 230 from the perspective of aircraft 200, such that radar transmissions 220 from aircraft 200 are too attenuated by flock of birds 230 to return a strong signal from flock of bats 240 to weather radar TX/RX system 102 onboard aircraft 200. However, weather radar system 104 onboard aircraft 200 may receive additional data from data aggregating system 150 that includes bird and bat detection data from another weather radar system 104 onboard aircraft 210 and/or from ground-based bird and bat detection radar system 212 that accurately and clearly characterizes flock of bats 240. The weather radar system 104 onboard aircraft 200 may thus graphically render the portions of a bird and bat data radar map corresponding to those areas of the sky accurately, e.g., with more accurate mapping of the flocks of birds and/or bats in the airspace, including by rendering flock icon 340 as shown in FIG. 4 to represent flock of bats 240.

Datalink service 140 may include and/or make use of one or more ground-based datalink assets, one or more telecommunication satellites, and potentially additional assets, as further described below with reference to FIG. 6. Data aggregating system 150 may use datalink service 140 to gather bird and bat detection data from various bird and bat detection assets, including and potentially beyond aircraft 200, 210 and at least some of non-aircraft data sources such as ground-based bird and bat detection radar system 212 as shown in FIG. 5. For example, data aggregating system 150 may also collect, receive, and aggregate data from bird and bat detection drones or unmanned aerial vehicles (UAVs), marine-based radar systems installed or carried on marine vessels, oil platforms or other marine-based platforms, or other marine vehicles or marine assets (not shown in FIG. 5), and/or any of a wide variety of other assets that may perform bird and bat detection.

Data aggregating system 150 is configured to transmit aggregated bird and bat detection outputs 242 to recipients such as aircraft 210, which may not be able to detect at least some of the birds or bats characterized in the data provided by data aggregating system 150. For example, aircraft 210 may use bird and bat detection data from data aggregating system 150, originating from sources such as aircraft 200 and ground-based bird and bat detection radar system 212, to re-evaluate and potentially modify the clearance, timing, course, and/or trajectory of its take-off from an airport.

In some examples, data aggregating system 150 may communicate the aggregated bird and bat detection data outputs with low latency or delay (e.g., within a selected interval of milliseconds or seconds in different examples) so that recipients receive the aggregated bird and bat detection data outputs while the data is still up-to-date and relevant to the current position of the aircraft. For example, data aggregating system 150 may transmit or communicate its aggregated bird and bat detection outputs to one or more recipients within a nominal latency of receiving the bird and bat detection data from the various participating aircraft and other data sources. In some examples, the nominal latency of providing the aggregated data outputs may be characterized in accordance with aviation data latency standards for externally sourced data provided to recipient aircraft or other recipients. For example, data latency standards in the aviation industry may specify overall data latency driven by requirements of systems or applications that use the data. Industry standards may establish common time reference so consumers of bird and bat detection data are able to determine the age of the data.

Bird and bat detection unit 106 may generate outputs, potentially based in part on aggregated bird and bat detection data output 242 received from data aggregating system 150, for display on MFD 138 or EFB 145 or other application executing on tablet 143 as shown in FIGS. 1 and 4. Use of MFD 138, EFB 145, or tablet 143 for display of bird and bat detection outputs 306, 308 may be simpler to implement because they would not have to go through a certification process with a flight authority such as the Federal Aviation Administration (FAA) in the U.S. In other examples, a bird and bat detection system of this disclosure could be certified and used for display on a weather radar graphical display device 108 of an aircraft's certified weather radar system.

Figure 6:
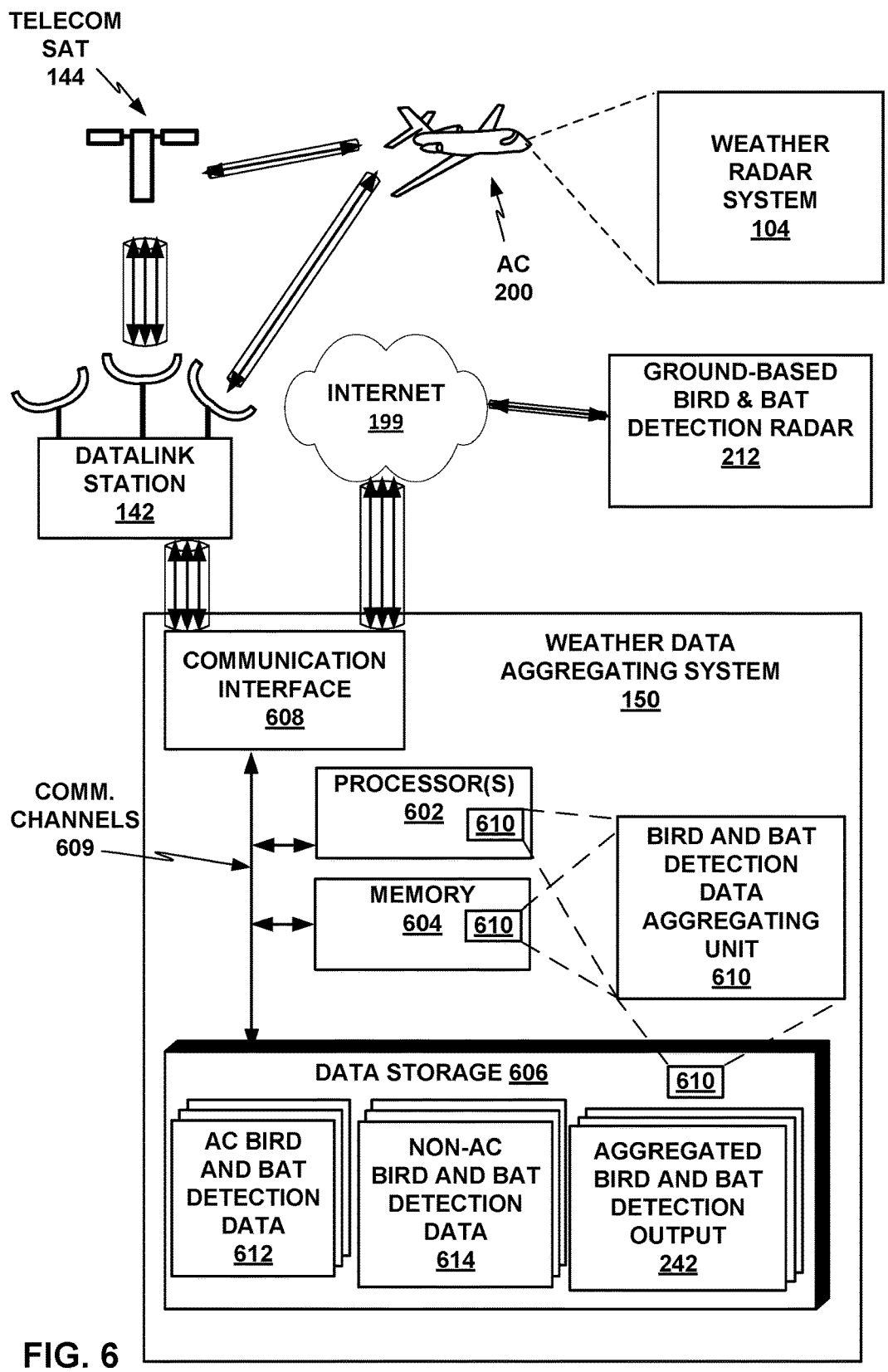
FIG. 6 depicts a conceptual diagram of an aircraft equipped with a weather radar processing system in communicative connection via a datalink service with a data aggregating system, in accordance with example aspects of this disclosure.

FIG. 6 depicts a conceptual diagram of an aircraft 200 equipped with a weather radar system 104 in communicative connection via datalink service 140 with data aggregating system 150, in accordance with example aspects of this disclosure. Data aggregating system 150 is configured to receive bird and bat detection data from multiple aircraft and other data sources via datalink service 140 and other communication systems, aggregate the bird and bat detection data, and output aggregated bird and bat detection outputs composed of aggregated collections of the bird and bat detection data. FIG. 6 provides additional detail, including of datalink service 140, of some examples corresponding to FIG. 5.

In the example of FIG. 6, datalink service 140 includes one or more datalink stations such as representative datalink station 142 and one or more telecommunications satellites such as representative telecommunications satellite 144. FIG. 6 also shows aircraft 200 and other non-aircraft data sources such as ground-based bird and bat detection radar system 212 as in FIG. 5. Telecommunications satellite 144 may be configured to maintain radio broadband datalink connections with aircraft 200. Telecommunications satellite 144 and datalink station 142 may be configured to maintain a radio broadband datalink connection 134 with each other.

Datalink station 142 may also be configured to maintain hard-line broadband network connections 136 with data aggregating system 150. Datalink station 142 may also communicate directly with aircraft 200 using point-to-point data communication channel 135, such as an implementation of Flight Information Services-Broadcast (FIS-B). Assets such as datalink station 142 and telecommunications satellite 144 may thus implement datalink service 140 to maintain broadband datalink connections among aircraft 200 and 210, data aggregating system 150, and other data collecting assets and aggregated data recipients.

In some examples, telecommunications satellite 144 may be equipped with broadband capability, such as Ka band datalink transmission and reception capability. In one example, telecommunications satellite 144 may be a Global Xpress (GX) satellite operated by Inmarsat PLC of London, United Kingdom. Telecommunications satellite 144 may be in geosynchronous Earth orbit (GEO) and may provide coverage over a large area of the Earth in some examples, and may interoperate with additional comparable telecommunications satellites that may provide complementary coverage over other large sections of the Earth, in some examples. Datalink service 140 may also be configured to include or operate with other types of remote coverage broadband datalink systems, such as broadband datalink connections implemented by drones or automated airships, for example.

In some examples, data aggregating system 150 may also have a communicative connection (e.g., via datalink and/or hard-line broadband network connections) with certain other non-aircraft data sources, which may include one or more ground-based radar stations, marine-based radar systems, space-based weather satellites, and/or data services, for example. Data aggregating system 150 may receive bird and bat detection data from any of these other non-aircraft data sources via hard-line broadband network connections 136 or another suitable communication link, and aggregate the bird and bat detection data from any of these other non-aircraft data sources with the bird and bat detection data that data aggregating system 150 receives from at least some of aircraft 200, 210, and other bird and bat detection data gathering assets.

Aircraft 200, 210 and other bird and bat detection data gathering assets are thus enabled to communicate bird and bat detection data to data aggregating system 150. Data aggregating system 150 is thus enabled to receive bird and bat detection data from various aircraft and from various non-aircraft sources, to aggregate the bird and bat detection data from the aircraft and other sources, and to communicate the aggregated data to recipients. In other examples, onboard weather radar system 104 and data aggregating system 150 may use any other implementation of data connection to communicate data with each other.

In some examples, datalink station 142 includes radio transmission and reception equipment (e.g., a Ka band radio interface) configured to maintain broadband datalink communications with various aircraft and other data sources directly and/or via other elements of datalink service 140 as shown in FIG. 5, in accordance with one example of this disclosure. Data aggregating system 150 as shown in FIG. 6 may be a more detailed view of some examples of data aggregating system 150 as shown in FIG. 5.

As shown in FIG. 6, data aggregating system 150 includes one or more processors 602 ("processors 602"), one or more memory components 604 ("memory 604"), one or more data storage devices 606 ("data storage 606"), and a communication interface (CI) 608 (e.g., including a network interface or bus interface), which is connected to one or more of the other components of data aggregating system 150 via communication channels 609 (e.g., a or communications bus) and communicatively coupled via datalink station 142 to other elements of datalink service 140. Data aggregating system 150 is thus configured to communicate with various aircraft and other data sources, such as ground-based bird and bat detection radar system 212, as shown in FIG. 5 via datalink service 140.

In data aggregating system 150, the processors 602, memory 604, data storage 606, and communication interface 608 are interconnected by communication channels 609, such as a bus or communication fabric, for transporting or communicating data and instruction code between processors 602, memory 604, data storage 606, and communication interface 608. Processors 602 may include one or more central processing units (CPUs), one or more CPU cores, one or more graphical processing units (GPUs), one or more digital signal processors (DSPs), one or more application-specific integrated circuits (ASICs), one or more field programmable gate array (FPGAs), or any other type of processing units or other discrete or integrated logic circuitry. Functions attributed to processors 602 may be embodied as software, firmware, hardware, and combinations thereof.

Memory 604 may include any form of working memory, such as any form of random access memory (RAM), cache circuits, and/or one or more volatile or more or less short-term data storage devices. In some examples, memory 604 may host in-memory data stores. Data storage 606 may include any form of hard disc drives, redundant array of independent discs (RAID), Flash drives, cloud storage, or any other form of data storage, and may host any form of databases, schemaless data stores, or any type of data stores. Data aggregating system 150 may process incoming data and outgoing data via communication interface 608, which may include interface subsystems for managing data communication with external resources such as datalink station 142 and datalink service 140, and one or more public and/or private networks such as the Internet 199. Communication interface 608 may include circuitry and hardware for receiving and processing data from datalink station 142 and for communicating data to datalink station 142. Data aggregating system 150 may receive data from one or more non-aircraft data sources via hard-line broadband connections through the Internet 199 or another suitable communication system.

Data aggregating system 150 has a bird and bat detection data aggregating unit 610 installed thereon. Bird and bat detection data aggregating unit 610 may include or be a software application, software library, or any other form or set of software stored in data storage 606, loaded in memory 604, and/or executed by processors 602. Bird and bat detection data aggregating unit 610 may include or be any form of executable software instruction code, including a stand-alone application, one or more portions of an executable software application, a software library or collection of applications, processes, and/or microservices, a library of multiple executable software applications and associated classes, methods, processes, objects, functions, routines, or other resources, or other any other form of executable software instruction code. Bird and bat detection data aggregating unit 610 may also include or be implemented as or with specialized hardware such as one or more application-specific integrated circuits (ASICs), one or more field programmable gate arrays (FPGAs), and/or one or more graphical processing units (GPUs).

Bird and bat detection data aggregating unit 610 may configure processors 602 (or other processing hardware elements) to receive sets of bird and bat detection data from multiple sources, such as enhanced weather data sets from aircraft 200, 210 and non-aircraft weather data sets from non-aircraft data sources. Bird and bat detection data aggregating unit 610 may further configure processors 602 (or other processing hardware elements) to perform comparison of sets of weather radar data and/or other weather data from multiple sources. These and other functions and capabilities for which bird and bat detection data aggregating unit 610 may configure processors 602 are further described below.

Weather data aggregating unit 610 may generate aggregated bird and bat detection data outputs 242 based on bird and bat detection data sets 612 from aircraft 200, 210 and non-aircraft bird and bat detection data sets 614, as further explained below. Bird and bat detection data aggregating unit 610 may at least temporarily load and/or store aggregated bird and bat detection data outputs 242 in memory 604 and/or data storage 606. Bird and bat detection data aggregating unit 610 may output aggregated data outputs 242 for communication via communication interface 608 and potentially via datalink station 142 and datalink service 140, Internet 199, an airport WiFi system (not shown in FIG. 6) that connects an aircraft at an airport (e.g., aircraft 210) or a tablet computer used by a pilot of an aircraft at an airport to Internet 199, and/or other modes of communication to recipients of the aggregated data.

Data aggregating system 150 may use any of various communication means to communicate aggregated bird and bat detection data to a bird and bat detection unit 106 onboard an aircraft (e.g., aircraft 210) depending on the type of interface device the particular bird and bat detection unit 106 is using. In some examples in which the bird and bat detection unit 106 is interfacing with an onboard server 118 and an MFD 138, data aggregating system 150 and bird and bat detection unit 106 may communicate with each other via the Aircraft Communications Addressing and Reporting System (ACARS) using a Very High Frequency (VHF) radio network via onboard server 118. In some examples in which the bird and bat detection unit 106 is interfacing with an EFB 145 or other application executing on a tablet 143, data aggregating system 150 and bird and bat detection unit 106 may communicate with each other via Internet connection, potentially also including an airport WiFi system, a broadband mobile connection such as a 4G/LTE service, and/or a satellite-based or ground-based in-flight Internet connection service. In some examples in which the bird and bat detection unit 106 is interfacing with weather radar graphical display device 108, data aggregating system 150 and bird and bat detection unit 106 may communicate with each other via datalink service 140 and telecommunications satellite 144 via onboard server 118, which may facilitate certified and secured connectivity.

Bird and bat detection data aggregating system 150 thus includes one or more processors 602 configured to receive bird and bat detection data from one or more relaying aircraft 200, 210, wherein the bird and bat detection data comprises bird and bat detection data from one or more aircraft 200, 210. One or more processors 602 of data aggregating system 150 are further configured to receive bird and bat detection data from one or more non-aircraft bird and bat detection data sources, aggregate the bird and bat detection data from one or more aircraft 200, 210 and the bird and bat detection data from the one or more non-aircraft data sources, thereby generating an aggregated bird and bat detection data set, and generate aggregated bird and bat detection outputs 242 based at least in part on the aggregated bird and bat detection data set. The aggregated bird and bat detection outputs 242 may be customized to the location or trajectory of a recipient (e.g., aircraft 210), in some examples. In some examples, data aggregating system 150 may also share bird and bat detection data via global Bird Notice to Airmen (BIRDTAM) system to be broadly available to other aircraft.

Bird and bat detection unit 106 onboard aircraft 210 and data aggregating system 150 may exchange data with each other throughout a flight of aircraft 210, beginning before take-off, when bird and bat detection unit 106 may rely on bird and bat detection data from data aggregating system 150 to evaluate and potentially modify a planned clearance and flight plan. In some examples, bird and bat detection unit 106 may scan for data less often or not at all once aircraft 210 is at a selected altitude above which bird and bat strike may pose little or no potential hazard, such as 5,000 feet, for example, and may resume activity once below the selected altitude again on descent. When aircraft 210 is on approach to a landing site, bird and bat detection unit 106 may evaluate bird and bat detection data collected via the aircraft's own weather radar TX/RX system 102 and weather radar system 104, potentially in addition to data from data aggregating system 150, to evaluate any potential changes of clearance, course, or heading to avoid any potential bird or bat strike hazards on approach to landing, such as a go-around and second approach, canceling the approach, or using an alternate runway for landing.

In some examples, one or more processors 602 of data aggregating system 150 may apply a subscriber agreement in managing and periodically confirming or modifying a list of its recipients to which to transmit the aggregated bird and bat detection outputs 242. For example, data aggregating system 150 may provide transmissions to different recipients in accordance with terms of service subscriptions with clients associated with the recipients, such as airlines or other operators of aircraft fleets, airports, or web interface weather data clients with different subscription plans for different levels of data. The subscriptions may also include agreements for subscribers such as airports that operate their own bird and bat detectors to share bird and bat detection data with data aggregating system 150 and to receive aggregated bird and bat detection data back from data aggregating system 150.

The recipients may also include entities other than operators of the aircraft, who may have different subscription terms, such as for occasional communications of aggregated bird and bat detection data sets in bulk data form rather than for transmitting aggregated bird and bat detection outputs in nominal real-time as with recipient aircraft in flight. Non-aircraft recipients may include a data mining system or an operator thereof, for example, that may analyze the aggregated bird and bat detection data sets for additional useful purposes. Non-aircraft recipients may include an air navigation service provider (ANSP), a jurisdictional aviation regulatory authority, an aeronautics agency, an academic research body, an animal conservation group or authority, or other enterprise, any of which may subscribe to receive the aggregated bird and bat detection data sets in nominal real-time and/or in periodic bulk data.

As another example of a non-aircraft recipient subscribed to receive the aggregated weather data sets from data aggregating system 150 in real-time, an aviation authority may use this service to monitor potential bird and bat strike hazards. The aviation authority may issue warnings or revise flight plans or clearances to prompt aircraft to avoid risks of potential bird and bat strikes.

While the examples of FIGS. 5 and 6 shows a single integrated data aggregating system 150 hosted at a single ground station, data aggregating system 150 may take a wide variety of other forms in other implementations. For example, data aggregating system 150 may be implemented across multiple assets such as geographically distributed data centers. In other examples, data aggregating system 150 or a control interface thereof may be implemented on a single mobile device such as a laptop or smartphone. In other examples, data aggregating system 150 may be hosted on one or more aircraft, which may coincide with one or more of the aircraft described above, such as example aircraft 200, such that all of the functions of bird and bat detection data aggregating system 150 are performed onboard aircraft 200. In other examples, data aggregating system 150 may be hosted on one or more space-based assets, which may coincide with telecommunications satellite 144 and/or one or more additional satellites.

In some examples, aircraft 200 may be an unpiloted aircraft (e.g., an uncrewed aerial vehicle (UAV)) or an aircraft on autopilot or otherwise being flown entirely or in part by software, and the automatic flight software may be enabled to make tactical navigation decisions. In these examples, bird and bat detection unit 106 may cause weather radar system 104 to generate bird and bat strike avoidance outputs to the automatic flight software directly as data to feed to a navigation decision module, instead of as data for a graphical display device to render in a graphical display. In these examples, bird and bat detection unit 106 may analogously cause weather radar system 104 to generate bird and bat detection outputs that a navigation unit of the unpiloted aircraft may use for bird and bat strike avoidance. Bird and bat detection unit 106 may thus enable an automatic software-based navigation and/or piloting system to make decisions based on an accurate characterization of bird and bat strike hazards.

Figure 7:
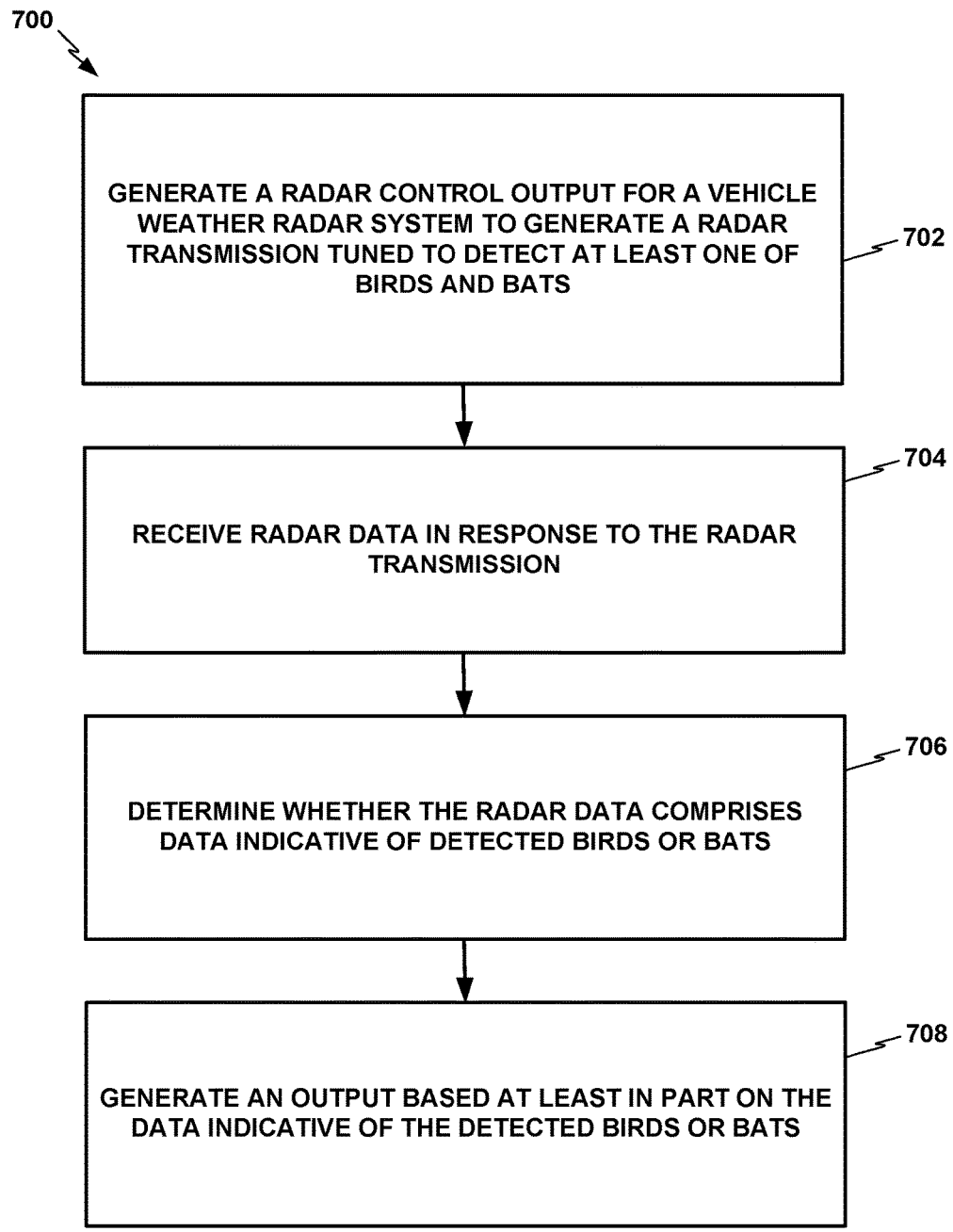
FIG. 7 shows a flowchart for an example method that a bird and bat detection unit may perform for generating a bird and bat detection output, in accordance with example aspects of this disclosure.

FIG. 7 shows a flowchart for an example method 700 that bird and bat detection unit 106 may perform for generating a bird and bat detection output, in accordance with example aspects of this disclosure. Method 700 includes generating, by a vehicle weather radar system (e.g., weather radar system 104) that comprises one or more processors (e.g., one or more processors 122 of weather radar system 104) and is onboard a vehicle (e.g., aircraft 100, 200, 210), a radar control output for the vehicle weather radar system (e.g., aircraft weather radar TX/RX system 102) to generate a radar transmission tuned to detect at least one of birds and bats (702). Method 700 further includes receiving, by the computing device, radar data in response to the radar transmission (e.g., weather radar system 104 receiving radar data via aircraft weather radar TX/RX system 102) (704).

Method 700 further includes determining, by the computing device, whether the radar data comprises data indicative of detected birds or bats (e.g., bird and bat detection unit 106 determining that the data are indicative of detected birds and bats as described above) (706). Method 700 further includes generating, by the computing device, an output based at least in part on the data indicative of the detected birds or bats (e.g., bird and bat detection outputs 306, 308 output for rendering on a graphical display device such as MFD 138, tablet 143, weather radar graphical display device 108) (708). Some additional details of some examples are described below.

In some examples, the weather radar data may include, for example, radar reflectivity data in an earth-referenced three-dimensional (or "volumetric") memory buffer (e.g., in one or more memory devices 124 in weather radar system 104). The memory buffer may include the radar imaging data combined with sources of three-dimensional geographic and atmospheric data and sources of three-dimensional aircraft data on the aircraft's position, altitude, heading, and speed, for example. One or more processors onboard the aircraft may combine the three-dimensional radar imaging data, the geographic and atmospheric data, and the aircraft data to store in the memory buffer, and/or in other data storage (e.g., data storage 126). A weather radar system, e.g., onboard an aircraft, may be configured to scan the entire three-dimensional space in front of the aircraft, and the one or more processors may store the reflectivity data in the three-dimensional memory buffer. The one or more processors onboard the aircraft may update the memory buffer with newly obtained radar reflectivity data. The one or more processors may extract reflectivity data from the memory buffer to generate desired bird and bat detection information as well as weather information, and for bird and bat detection unit 106 to apply supplemental criteria incorporating supplemental data such as infrared sensor data from infrared sensor 112, without having to make and wait for view-specific antenna scans. In addition, with the three-dimensional volumetric buffer data, the presentation of weather information is not constrained to a single tilt-plane such as is inherent to conventional radar.

In some examples, weather radar system 104 may generate bird and bat detection outputs configured for a high-resolution display enabled for display of a three-dimensional (3D) view of detected flocks of birds or bats and the reflectivity range of each of its portions. This high-resolution display of detected flocks of birds or bats may be enabled for a high resolution in time, such as a high frame rate (e.g., above a selected frame rate). In addition, or instead, this high-resolution display of detected flocks of birds or bats may also be enabled for a high range (e.g., above a selected distance threshold). The high-resolution display of detected flocks of birds or bats and the reflectivity range of each of its portions as potentially modified by bird and bat detection unit 106 may serve as a valuable resource in assisting the crew of the aircraft 200 in understanding the detected flocks of birds or bats, and whether or how they should alter their flight strategy or flight plan to avoid the detected flocks of birds or bats.

The techniques of this disclosure may be implemented in a device or article of manufacture comprising a computer-readable storage medium. The term "processor," as used herein may refer to any of the foregoing structure or any other structure suitable for processing program code and/or data or otherwise implementing the techniques described herein. While weather radar TX/RX system 102 and weather radar system 104 with bird and bat detection unit 106 are separate systems in the example depicted in FIG. 1, in other examples, features or aspects of weather radar system 104 with bird and bat detection unit 106 may be implemented as parts of a weather radar system as a single integrated unit. In some such examples, bird and bat detection unit 106 may be implemented as a feature or function of onboard aircraft weather radar TX/RX system 102, or onboard aircraft weather radar TX/RX system 102 and weather radar system 104 with bird and bat detection unit 106 may be implemented together as a single system, subsystem, device, or component.

Elements of weather radar system 104 and/or bird and bat detection unit 106, and/or system elements for executing and/or storing bird and bat detection unit 106 or features thereof (e.g., one or more processors 122) as disclosed above, may be implemented in any of a variety of types of solid state circuit elements, such as central processing units (CPUs), digital signal processors (DSPs), application-specific integrated circuits (ASICs), a magnetic nonvolatile random-access memory (RAM) or other types of memory, a mixed-signal integrated circuit, a field programmable gate array (FPGA), a microcontroller, a programmable logic controller (PLC), a system on a chip (SoC), a subsection of any of the above, an interconnected or distributed combination of any of the above, or any other integrated or discrete logic circuitry, or any other type of component or one or more components capable of being configured in accordance with any of the examples disclosed herein. One or more memory devices 124 may include any volatile or non-volatile media, such as a RAM, ROM, non-volatile RAM (NVRAM), electrically erasable programmable ROM (EEPROM), flash memory, and the like. One or more memory devices 124 may store computer readable instructions that, when executed by one or more processors 122, cause the one or more processors 122 to implement the techniques attributed to bird and bat detection unit 106 herein.

Elements of bird and bat detection unit 106 may be programmed with various forms of software. Bird and bat detection unit 106 may be implemented at least in part as, or include, one or more executable applications, application modules, libraries, classes, methods, objects, routines, subroutines, firmware, and/or embedded code, for example. Elements of bird and bat detection unit 106 as in any of the examples herein may be implemented as a device, a system, or an apparatus, and may embody or implement a method of enhanced weather radar mapping, including for implementing example method 700 as described with reference to FIG. 7.

The techniques of this disclosure may be implemented in a wide variety of computing devices. Any components, modules or units have been described provided to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

Aircraft 100 as shown in FIG. 1 may be implemented as any type of aircraft. Analogous weather radar systems with bird and bat detection techniques of this disclosure may also be implemented in other contexts such as a ground-based weather station or a marine weather radar system for equipping a marine vessel. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying craft. An "aircraft" as described and claimed herein may include any crewed or uncrewed craft (e.g., uncrewed aerial vehicle (UAV), flying robot, or automated cargo or parcel delivery craft). While examples involving an aircraft weather radar system disposed onboard an aircraft are discussed, other examples of this disclosure may be implemented in any type of vehicular radar system onboard any type of vehicle, such as a marine vessel or a spacecraft, for example.

While the example of FIG. 1 shows weather radar system 104 communicating processed weather radar outputs to weather radar graphical display device 108 for graphical display for a pilot or flight crew, in other examples, weather radar system 104 may communicate processed weather radar outputs to another system, component, device, software module, computer, or other feature. For example, in an automated navigation system or in an uncrewed aircraft that does not include a graphical radar display, weather radar system 104 may communicate processed weather radar outputs to a software module, computer, embedded circuit, or other feature that performs automated navigation.

Various illustrative aspects of the disclosure are described above. These and other aspects are within the scope of the following claims.

What is claimed is:

1. A method comprising:
    performing, by a vehicle weather radar system that comprises one or more processors and is onboard a vehicle, a first full weather radar scan of an area of sky;
    generating, by the vehicle weather radar system during at least part of an interval between the first full weather radar scan and a second full weather radar scan, a radar transmission tuned to detect at least one of birds and bats;
    receiving, by the vehicle weather radar system, reflected radar signals in response to the radar transmission;
    determining, by the vehicle weather radar system, whether the reflected radar signals comprise data indicative of detected birds or bats;
    generating, by the vehicle weather radar system, an output based at least in part on the data indicative of the detected birds or bats; and
    performing, by the vehicle weather radar system after receiving the reflected radar signals, the second full weather radar scan of the area of sky.

2. The method of claim 1, further comprising intermittently alternating between weather detection and bird and bat detection.

3. The method of claim 1, wherein generating the radar transmission comprises generating the radar transmission for a digital adaptive phased array (DAPA) weather radar.

4. The method of claim 1, further comprising communicating the output for transmission to a data aggregating system external to the vehicle.

5. The method of claim 1, further comprising:
    receiving additional bird and bat detection data from an external data aggregating system; and
    integrating, in the output, the additional bird and bat detection data from the external data aggregating system with the data indicative of the detected birds or bats determined from the reflected radar signals.

6. The method of claim 1, further comprising:
    receiving, with the one or more processors, infrared sensor data from a vehicle infrared sensor onboard the vehicle; and
    determining, with the one or more processors, whether the infrared sensor data comprises data indicative of detected birds or bats,
    wherein generating the output is further based at least in part on the data from the infrared sensor data indicative of the detected birds or bats.

7. The method of claim 6, further comprising integrating the data indicative of detected birds or bats from the reflected radar signals and the data indicative of detected birds or bats from the infrared sensor data,
    wherein the output is further based at least in part on the integrated data indicative of detected birds or bats from the reflected radar signals and from the infrared sensor data.

8. The method of claim 1, further comprising predicting a future trajectory of the detected birds or bats by extrapolating a detected trajectory of the detected birds or bats.

9. The method of claim 1, further comprising predicting a future trajectory of the detected birds or bats by:
    determining a species of the detected birds or bats; and
    processing a detected trajectory of the detected birds or bats in comparison with a behavioral model of movements of birds or bats of the determined species.

10. The method of claim 9, wherein the behavioral model of movements of birds or bats of the determined species is trained using a machine learning process applied to a set of data on movements of birds or bats of the determined species.

11. The method of claim 1, wherein the output comprises a representation of a position of a detected flock and a representation of a direction of motion of the detected flock.

12. The method of claim 1, further comprising identifying a probability density function of the detected birds or bats using a kernel density estimator.

13. The method of claim 1, further comprising:
    determining one or more levels of risk that the detected birds or bats may pose to an aircraft; and
    rendering different flock icons in different colors to represent the determined one or more levels of risk.

14. The method of claim 1, further comprising identifying a probability density function of the detected birds or bats using a machine learning process applied to a set of data on movements of birds or bats of the determined species.

15. A vehicular weather radar system comprising:
    one or more processors; and
    one or more memory devices operably coupled to the one or more processors, wherein the one or more processors are configured to:
        perform a first full weather radar scan of an area of sky;
        generate, during at least part of an interval between the first full weather radar scan and a second full weather radar scan, a radar transmission tuned to detect at least one of birds and bats;
        receive reflected radar signals in response to the radar transmission;
        determine whether the reflected radar signals comprise data indicative of detected birds or bats;
        generate an output based at least in part on the data indicative of the detected birds or bats; and
        perform, after receiving the reflected radar signals, the second full weather radar scan of the area of sky.

16. The vehicular weather radar system of claim 15, further comprising a digital adaptive phased array (DAPA) radar including:
    a weather radar transmission and reception system configured to transmit and receive combined pulsed and frequency modulated continuous wave (FMCW) modulated radar transmissions; and
    a radar antenna,
    wherein generating the radar transmission comprises generating the radar transmission for the DAPA radar antenna and for the combined pulsed and frequency modulated continuous wave (FMCW) modulated radar transmissions.

17. The vehicular weather radar system of claim 15, further comprising:
receiving additional bird and bat detection data from an external data aggregating system; and
integrating, in the output, the additional bird and bat detection data from the external data aggregating system with the data indicative of the detected birds or bats determined from the reflected radar signals.

18. The vehicular weather radar system of claim 15, further comprising an infrared sensor, wherein the one or more processors are further configured to:
receive infrared sensor data from the infrared sensor; and
determine whether the infrared sensor data comprises data indicative of detected birds or bats,
wherein generating the output is further based at least in part on the data from the infrared sensor data indicative of the detected birds or bats.

19. A vehicular weather radar device comprising:
one or more processors; and
one or more memory devices operably coupled to the one or more processors, wherein the one or more memory devices comprise executable instructions configured to cause the one or more processors to:
perform a first full weather radar scan of an area of sky;
generate, during at least part of an interval between the first full weather radar scan and a second full weather radar scan, a radar transmission tuned to detect at least one of birds and bats;
receive reflected radar signals in response to the radar transmission;
determine whether the reflected radar signals data indicative of detected birds or bats;
generate an output based at least in part on the data indicative of the detected birds or bats; and
perform, after receiving the reflected radar signals, the second full weather radar scan of the area of sky.

20. The vehicular weather radar device of claim 19, wherein the one or more memory devices comprise executable instructions configured to cause the one or more processors to:
receive additional bird and bat detection data from an external data aggregating system; and
integrate, in the output, the additional bird and bat detection data from the external data aggregating system with the data indicative of the detected birds or bats determined from the reflected radar signals.

* * * * *